United States Patent [19]

Nishida et al.

[11] Patent Number: 4,790,286

[45] Date of Patent: Dec. 13, 1988

[54] EGR CONTROL DEVICE FOR INTERNAL COMBUSTION ENGINE

[75] Inventors: Minoru Nishida; Noriyuki Inoue; Yoshiaki Asayama; Hiroyoshi Suzuki, all of Hyogo, Japan

[73] Assignee: Mitsubishi Denki Kabushiki Kaisha, Tokyo, Japan

[21] Appl. No.: 126,059

[22] Filed: Nov. 27, 1987

[30] Foreign Application Priority Data

May 31, 1986 [JP] Japan .............................. 61-126508
Dec. 2, 1986 [JP] Japan .............................. 61-288424
Dec. 2, 1986 [JP] Japan .............................. 61-288426

[51] Int. Cl.$^4$ ............................................ F02M 25/06
[52] U.S. Cl. ..................................................... 123/571
[58] Field of Search ............... 123/571, 568; 60/276, 60/278, 285; 364/431.06

[56] References Cited

U.S. PATENT DOCUMENTS

| | | | |
|---|---|---|---|
| 4,005,689 | 2/1977 | Barnard | 60/278 X |
| 4,108,122 | 8/1978 | Barnard | 60/276 X |
| 4,168,683 | 9/1979 | Hata et al. | 123/571 |
| 4,411,242 | 10/1983 | Igashira et al. | 123/571 X |
| 4,445,489 | 5/1984 | Kobayashi et al. | 123/571 |
| 4,614,175 | 9/1986 | Asayama | 123/571 |
| 4,705,009 | 11/1987 | Asayama | 123/571 |

Primary Examiner—Willis R. Wolfe
Attorney, Agent, or Firm—Sughrue, Mion, Zinn, Macpeak & Seas

[57] ABSTRACT

An EGR device for an IC engine is disclosed which comprises an EGR control valve installed in an EGR passageway communicating with an exhaust system and an intake system of an internal combustion engine, an oxygen sensor for detecting the oxygen content of the intake air installed in the downstream of the opening of the EGR passageway in said intake system, a pressure sensor for detecting the atmospheric pressure in the oxygen sensor, and an EGR controller for computing a first quantity corresponding to a target exhaust gas reflux rate, correcting the output signal of the oxygen sensor using the output signal of the pressure sensor, and opening or shutting said EGR control valve in proportion to the deviation of the second quantity thus corrected from the first quantity in order to set the operating condition of the engine in conformity with a predetermined target EGR rate.

4 Claims, 6 Drawing Sheets

EGR CONTROL DEVICE FOR INTERNAL COMBUSTION ENGINE

BACKGROUND OF THE INVENTION

The present invention relates to an exhaust gas recirculation (EGR) control device for controlling the quantity of exhaust gas to be recirculated for an internal combustion engine (IC engine).

A known arrangement is to recirculate exhaust gas by introducing part of the exhaust gas into the intake side of an internal combustion engine in order to reduce NOx as a noxious component contained in the exhaust gas of the engine.

The flow rate of the exhaust gas to be thus recirculated is primarily concerned with reduction of NOx but it also affects the performance of the engine and the fuel cost, so it is desirous to accurately control the flow rate in accordance with the operating conditions of the engine.

Figure 1:
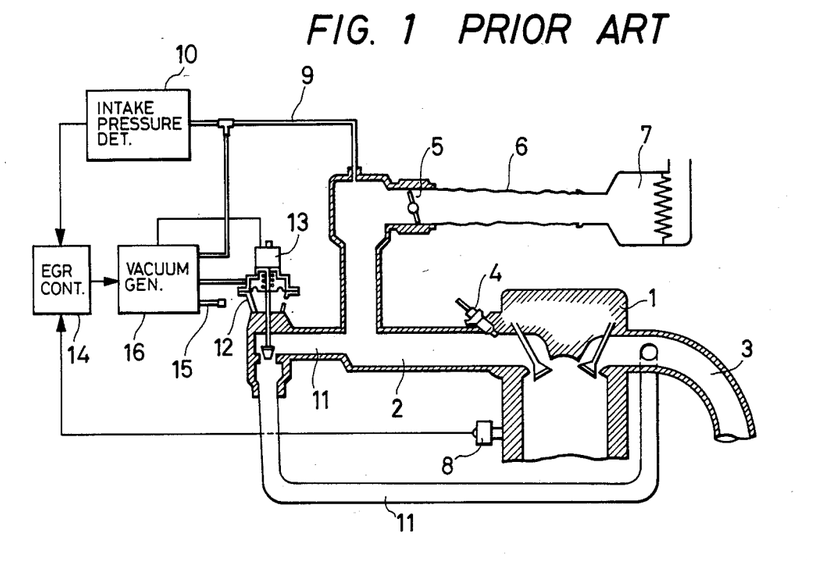
FIG. 1 is a diagram illustrating the construction of a conventional EGR control device for an IC engine.

FIG. 1 shows a conventional EGR control device of the sort disclosed by Japanese Patent Application (OPI) No. 93950/80. In FIG. 1, there is shown an engine body 1 with an intake manifold 2 and an exhaust manifold 3.

The intake manifold 2 is fitted with a fuel supply unit 4, whereas a throttle valve 5 is disposed close to a connection of the intake manifold 2 and an intake duct 6. An air cleaner 7 is disposed at the inlet of the intake duct 6.

An intake vacuum leading-in passageway 9 communicates with the intake manifold 2 and an intake pressure detector 10 is employed to detect the intake pressure of the intake manifold 2 via the intake negative pressure leading-in passageway 9.

The outputs of the intake pressure detector 10, an opening detector 13 of an EGR control valve 12 and an engine RPM detector 8 are supplied to an EGR control circuit 14.

The EGR control valve 12 is installed in an EGR passageway 11, which communicates with the exhaust manifold 3 and the intake manifold 2.

The output of the EGR control circuit 14 is used to control a control vacuum generator 16. The control vacuum generator 16 generates an actuator vacuum by regulating the intake vacuum and the atmospheric pressure to control the open-close degree of the EGR control valve 12.

The operation of the device will subsequently be described. The engine speed as a volume indicating the operating conditions of the engine and the intake pressure of the engine are respectively detected by the engine RPM detector 8 and the intake pressure detector 10 and the results thus detected are supplied to the EGR control circuit 14.

The volume of the EGR flowing through the EGR passageway 11 is determined by controlling the opening of the EGR control valve 12 by means of the output signal of the EGR control circuit 14 to regulate the output vacuum of the control vacuum generator 16 using the pressures in the intake vacuum leading-in passageway 9 and an atmospheric pressure leading-in passageway 15, so that the comparative deviation of the output value of the opening detector 13 corresponding to a target EGR rate stored in the EGR control circuit 14, depending on the volume indicating the operating conditions of the engine detected by the engine RPM detector 8 and the intake pressure detector 10, from the measured output value of the opening detector 13 interlocking with the EGR control valve 12 becomes zero.

More specifically, the opening of the EGR control valve 12 is controlled by feeding back the output of the opening detector 12 to obtain the EGR corresponding to the operating conditions of the engine.

In the conventional EGR control device, a large amount of carbon contained in exhaust gas will stick to the EGR control valve 12 if it is used for hours and therefore it is not controllable accurately because the initial flow rate of exhaust gas corresponding to the opening degree of the control valve changes.

SUMMARY OF THE INVENTION

The present invention aims at solving such problems and it is therefore an object of the invention to provide an exhaust gas recirculation control device free from aging and capable of accurate EGR control for an internal combustion engine.

The EGR control device for an internal combustion engine according to the present invention comprises an oxygen sensor for detecting the oxygen content of the intake air blended with exhaust gas, the oxygen sensor being installed in an intake manifold, a pressure sensor for detecting the atmospheric pressure in the oxygen sensor, and EGR control means for controlling the reflux flow rate of the exhaust gas on receiving the outputs of the oxygen sensor and the pressure sensor.

According to the present invention, the oxygen sensor is used to detect the oxygen content of the intake air and the pressure sensor is used to detect the atmospheric pressure of the oxygen sensor. The outputs of the oxygen sensor and the pressure sensor are supplied to the EGR control means to correct the fluctuation of the pressure output level of the oxygen sensor resulting from the fluctuation of the whole pressure of the intake air as the throttle valve of the engine is opened or shut. Then the opening of the EGR control valve is controlled by correcting the output of the oxygen sensor using the output of the pressure sensor to let the output of the oxygen sensor conform to the oxygen content of the intake air determined according to the calculated oxygen content and the set EGR rate corresponding to the operating conditions of the engine.

In the EGR control device for an internal combustion engine according to the present invention, the opening of the EGR control valve is regulated by correcting the output signal of the oxygen sensor with the computed quantity corresponding to the outer peripheral pressure computed from the output signals of the throttle opening sensor and the RPM detector and by grasping the actual oxygen content in proportion to the deviation of the computed quantity corresponding to the oxygen content thus corrected from the computed quantity corresponding to the predetermined target oxygen content in according with the operating conditions of the engine. Consequently, the EGR control accurate and free from aging becomes possible.

DESCRIPTION OF THE PREFERRED EMBODIMENT

Figure 2:
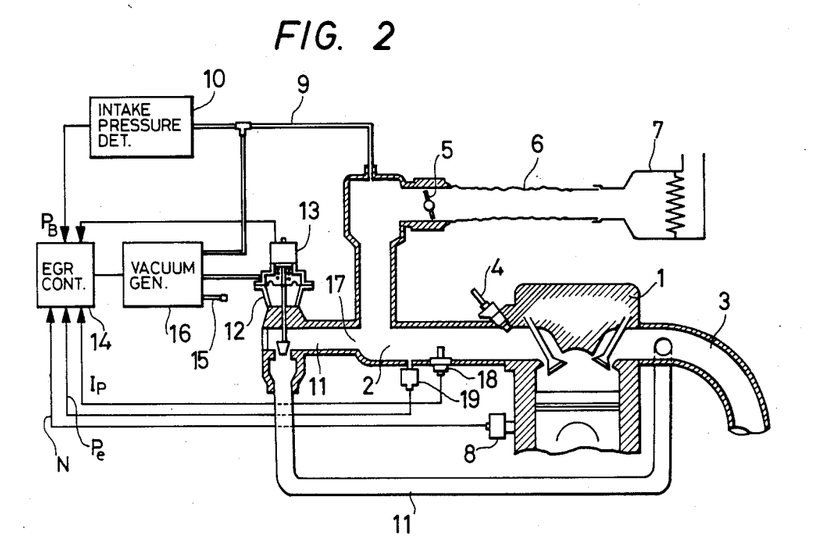
FIG. 2 is a diagram illustrating the construction of an EGR control device for an IC engine according to the present invention.

Referring now to the accompanying drawings, a description will subsequently be given of an EGR control device for an internal combustion engine according to the present invention. FIG. 2 shows the construction of an embodiment of the present invention. In FIG. 2, like reference characters are given to like component parts of FIG. 1 and component parts different from those of FIG. 1 are mainly described.

As is obvious from a comparison of FIG. 2 with FIG. 1, component parts marked with 1-16 in FIG. 2 are similar to those shown in FIG. 1 and those marked with 17 and up in FIG. 2 are newly installed and feature the present invention.

More specifically, an opening 17 is opened to the intake manifold in the EGR passageway 11 and an oxygen sensor 18 is installed in the intake manifold 2 of the downstream of the opening 17. The oxygen sensor 18 is used to detect the oxygen content of the intake air flowing in the intake manifold 2 and to generate a sensor output proportional to the oxygen content as in the case of an oxygen sensor of a solid electrolyte oxygen pump proposed in Japanese Patent Application (OPI) No. 153155/83.

The outputs of the oxygen sensor 18 and a pressure sensor 19 are sent to the EGR control circuit 14. The pressure sensor 19 is used to detect the atmospheric pressure of the oxygen sensor 18. The remaining construction is similar to what is shown in FIG. 1.

Figure 3A:
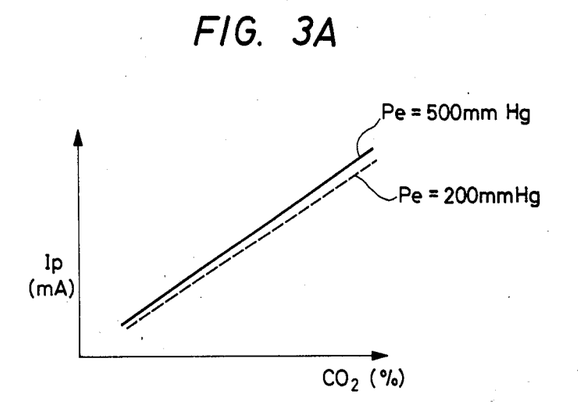
FIG. 3A is a graph illustrating the relation between the oxygen content $C_{O_2}$ and the output Ip of the oxygen sensor in order to describe the EGR control device of FIG. 2 for an IC engine.
Figure 3B:
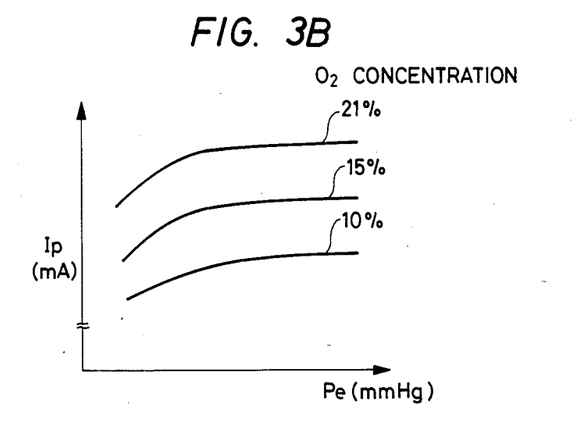
FIG. 3B is a graph illustrating the relation of the outer peripheral pressure Pe in order to describe the EGR control device of FIG. 2 for an IC engine.
Figure 4:
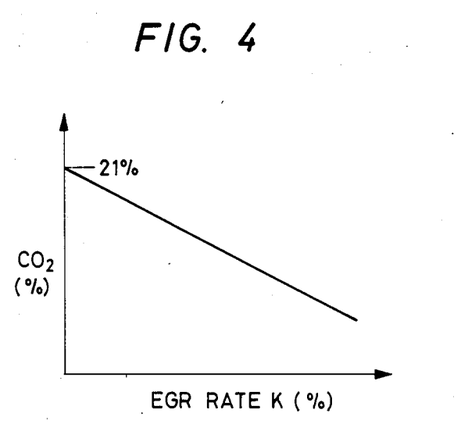
FIG. 4 is a graph illustrating the relation between the oxygen content of the intake air and an EGR rate K in the EGR control device of FIG. 2 for an IC engine.
Figure 5:
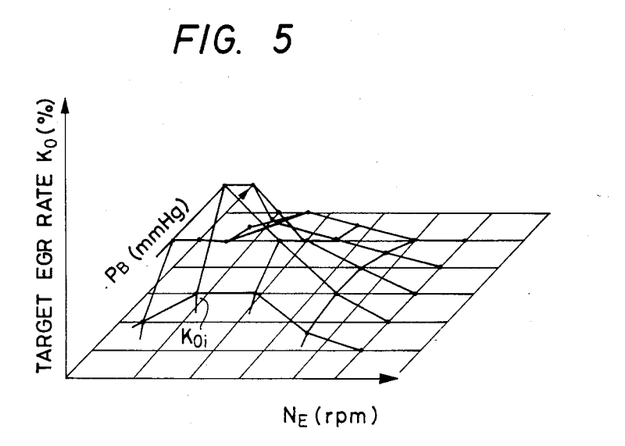
FIG. 5 is a graph illustrating a target EGR rate Ko in the EGR control device of FIG. 2 for an IC engine.

Referring to FIGS. 3A to 5, the operation of the embodiment will subsequently be described in detail. FIG. 3A is a graph illustrating the relation between the oxygen content $Co_2$ and the output Ip of the oxygen sensor 18, whereas FIG. 3B is a graph illustrating the level of the output Ip slightly changed by the outer peripheral pressure of the oxygen sensor 18. FIG. 4 is a graph illustrating the relation between an EGR rate K and the oxygen content $Co_2$ of the intake air. FIG. 5 is a graph illustrating a target EGR rate Ko determined in proportion to the operating conditions of the engine stored in the EGR control circuit 14.

When the engine 1 is started, an engine speed $N_E$ showing the operating conditions of the engine body 1 and the intake pressure $P_B$ of the engine are detected by the engine RPM detector 8 and the intake pressure detector 10 and the results thus detected are supplied to the EGR control circuit 14.

In the EGR control circuit 14, the target EGR rate Ko corresponding to the speed $N_E$ and the intake pressure $P_B$ is stored as shown in FIG. 5 and, depending on the speed $N_E$ and the intake pressure $P_B$, the target EGR rate Koi is selected.

The target oxygen content $Co_2i$ corresponding to the target EGR rate Koi is calculated in accordance with FIG. 4.

On the other hand, the oxygen content of the air blended with the EGR gas within the intake manifold is calculated from the output Ip of the oxygen sensor 18. However, the pressure in the intake manifold is always fluctuating within a range of the atmospheric pressure $-700$ mmHg in connection with the opening of the throttle valve 5 and the engine speed in normal operating condition.

As shown in FIG. 3A, the relation between the output Ip of the oxygen sensor 18 and the oxygen content is such that an output level roughly proportional to the oxygen content provided the outer peripheral pressure of the sensor is constant. However, if the whole outer peripheral pressure changes, the output level slightly changes as shown in FIG. 3B even though the oxygen content is constant.

In the EGR control circuit 14, accordingly, the peripheral pressure Pe of the oxygen sensor 18, together with the output Ip of the oxygen sensor 18, is taken in from the output of the pressure sensor 19 to calculate the oxygen content in consideration of FIG. 3B.

In other words, as shown by continuous and broken lines of FIG. 3A, the pressure Pe is used to correct the oxygen content $Co_2$.

The oxygen content $Co_2$ thus calculated is compared with the aforesaid target oxygen content $Co_2i$ and, based on the compared deviation, the output vacuum of the control vacuum generator 16 is regulated by the output of the EGR control circuit 14 using the pressures in the intake vacuum leading-in passageway 9 and the atmospheric pressure leading-in passageway 15. Then the opening of the EGR control valve 12 is controlled and the EGR gas volume is regulated to reduce the compared deviation to zero.

Although the EGR control valve 12 is vacuum driven via a pressure diaphragm in the embodiment above, it may be driven by an electric motor.

The opening detector 13 may also be dispensed with.

Moreover, the pressure sensor 19 is sufficient if the intake pressure detector 10 in the embodiment above is adapted to electrically prestoring what is related to the output signal of the pressure sensor in the EGR control circuit 14 concerning each operating condition of the engine.

The EGR control circuit 14 is composed of an electronic circuit including an electric storage circuit and it may be of an analog type or a digital type including an analog-digital converter and a microcomputer.

Although the pressure sensor 19 is installed separately from the oxygen sensor 18, both of them may be incorporated in one body.

As set forth above, the opening of the EGR control valve for controlling the volume of the EGR introduced into the intake air of the engine is controlled in such a manner as to let the oxygen content calculated in the EGR control circuit conform to the oxygen content in the intake air determined according to the set EGR rate corresponding to the operating conditions of the engine on the basis of the outputs of the oxygen sensor for detecting the oxygen content of the intake air blended with the exhaust gas and the pressure sensor for detecting the atmospheric pressure of the oxygen sensor. Accordingly, the EGR that is accurate and free from aging becomes possible.

Figure 6:
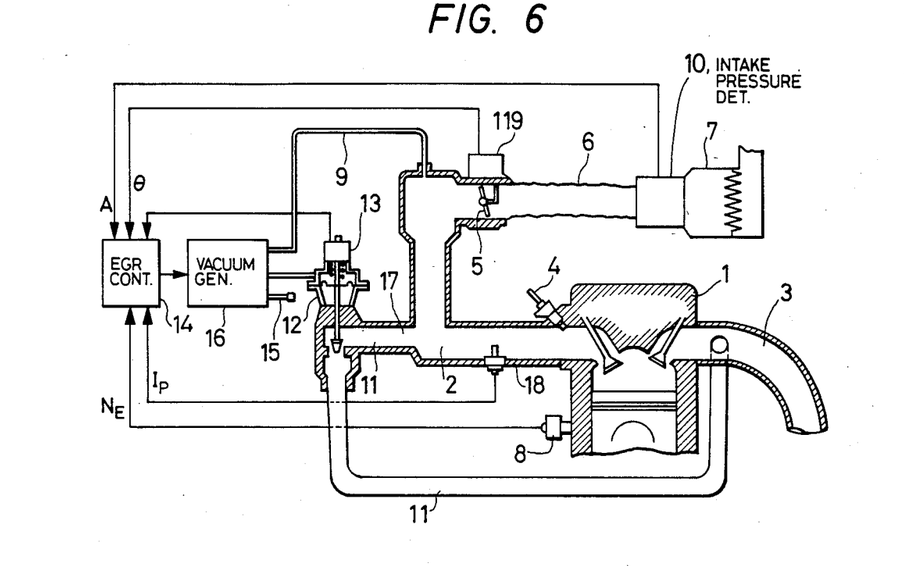
FIG. 6 is a diagram illustrating the construction of an EGR device for an IC engine according to another embodiment of the invention.

FIG. 6 shows another embodiment of the present invention, wherein there is shown a throttle opening sensor 119, consisting of, e.g., a potentiometer, for detecting the opening degree of the throttle valve 5 for regulating the air amount taken in by the engine, the throttle opening sensor being used to generate output voltage proportional to the open angle of the throttle valve 5. The outputs of the oxygen sensor 18 and the throttle opening sensor 119 are sent to the EGR control circuit 14.

Figure 7A:
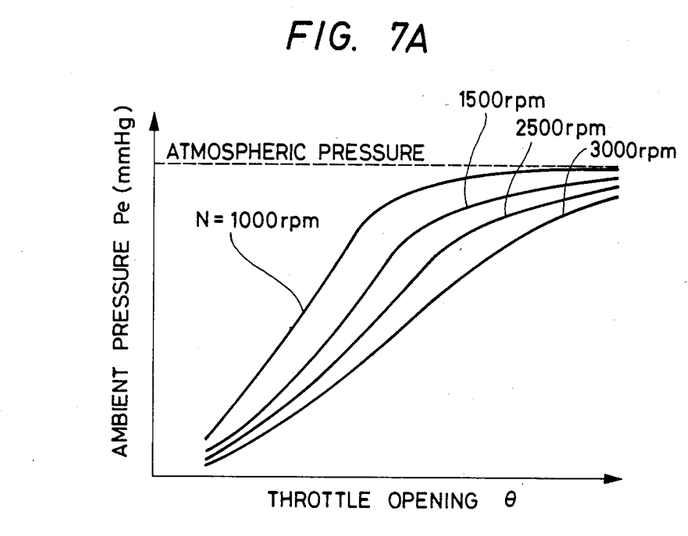
FIGS. 7A and 7B are graphs showing the relationships between the ambient pressure and throttle opening with respect to RPMs and EGR rates according to the second embodiment.
Figure 7B:
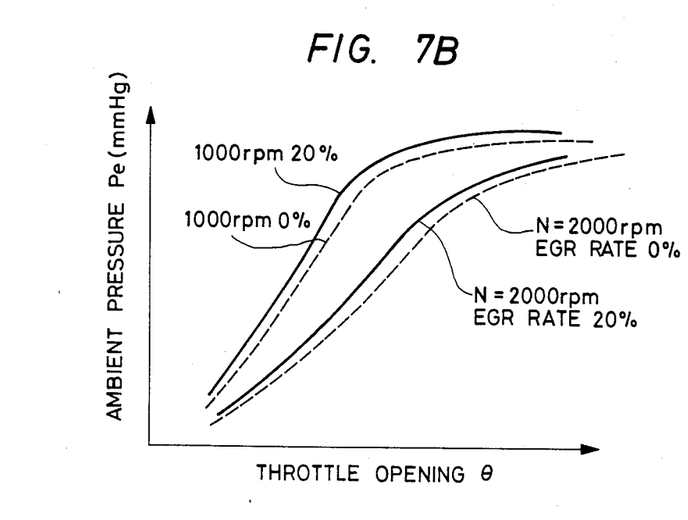

The corresponding relation of the outer peripheral pressure Pe of the oxygen sensor 18 to the opening angle $\theta$ of the throttle valve and the RPM N of the engine is experimentally obtained when the specification of the engine, the construction and structure of the intake system are determined. FIG. 7A shows a case where the EGR rate is 0%, i.e., no EGR exists. FIG. 7B shows a case where the EGR rate is 0% by a broken line and the relation between the throttle opening $\theta$ and the outer peripheral pressure Pe by a continuous line when the EGR rate is 20%. In the same manner, the relation depending on the EGR rate between the throttle opening $\theta$ and the outer peripheral pressure Pe can be obtained. These corresponding relations are stored in the EGR control circuit 14, which is used to take in the signals O and N from the throttle opening sensor 119 and the RPM detector B together with the output Ip of the oxygen sensor 18, so that oxygen content computations are carried out in consideration of the relation between the throttle opening $\theta$, the RPM N and the outer peripheral pressure Pe according to the respective EGR rates as shown in FIG. 7B as an example.

As shown in FIG. 3A by continuous and broken lines like the first embodiment, the oxygen content $C_{O2}$ is calculated by employing the pressure Pe for correction.

The oxygen content $C_{O2}$ thus computed is compared with the target oxygen content $C_{O2i}$ and, based on the compared deviation, the output vacuum of the control vacuum generator 16 is regulated by the output of the EGR control circuit 14 using the pressures in the intake vacuum leading-in passageways 9 and the atmospheric pressure leading-in passageway 15. The opening of the EGR control valve 12 is thus controlled to regulate the EGR amount so as to reduce the compared deviation to zero.

Figure 8:
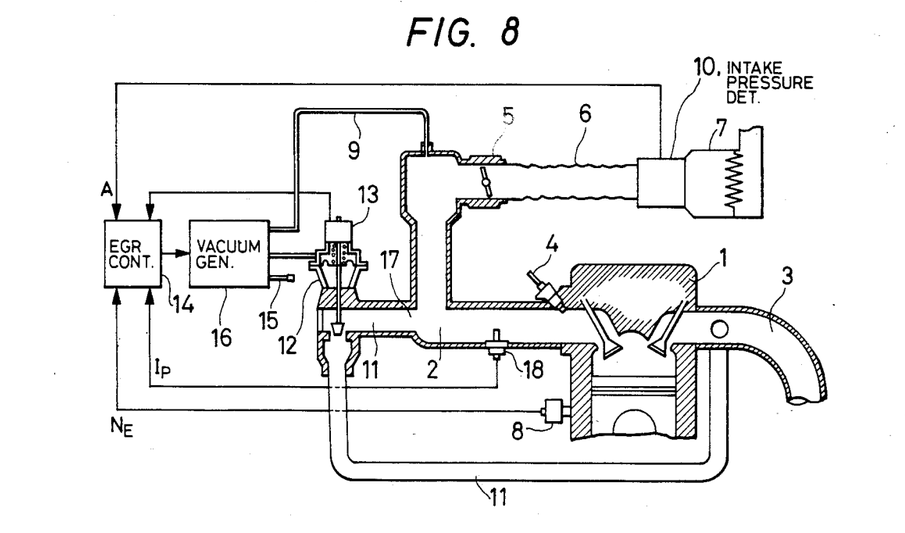
FIG. 8 is a diagram showing a third embodiment.
Figure 9A:
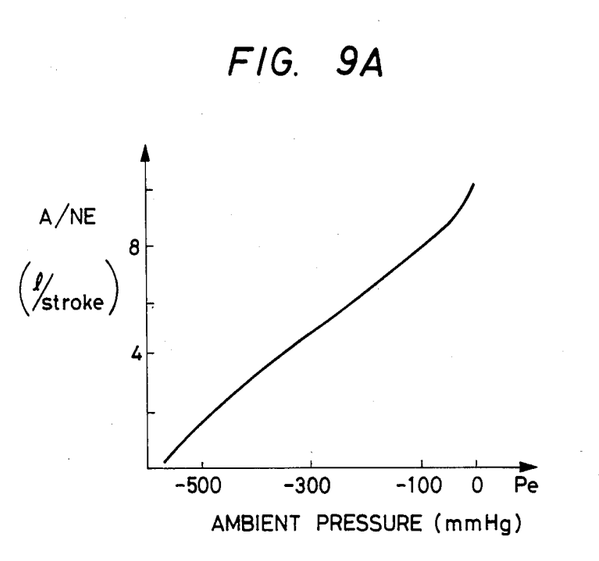
FIGS. 9A and 9B are graphs showing characteristics of the third embodiment.
Figure 9B:
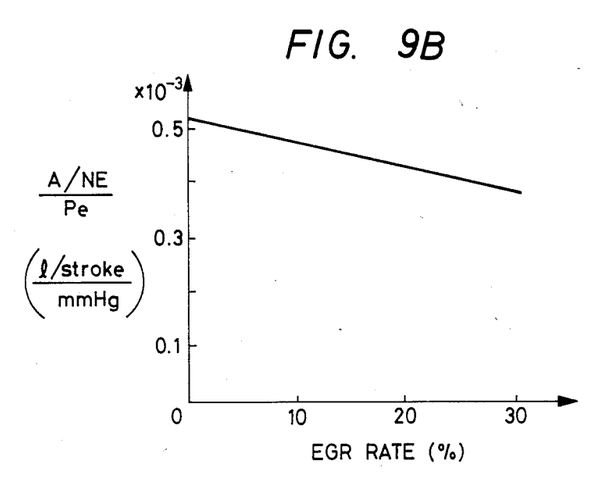

FIG. 8 shown another embodiment of the present invention, wherein given the air flow rate of A and the RPM of the engine of $N_E$ against the outer peripheral pressure Pe of the oxygen sensor, the computed quentity expressed by $A/N_E$; i.e., the relation to the quantity proportional to the intake amount per stroke of the engine cylinder is proportional to 1 to 1 when the EGR rate is zero as shown in FIG. 9A and, when the EGR rate is changed, the ratio of $A/N_E$ to Pe in such as shown in FIG. 9B. The two corresponding relations are stored in the EGR control circuit 14, which is used to take in the signals A, $N_E$ from the air flow rate sensor 10 and the RPM detector 8, together with the output Ip of the oxygen sensor 18, so as to calculate the oxygen content in consideration of FIG. 3B.

As shown in FIG. 3A by continuous and broken lines, the oxygen content $C_{O2}$ is calculated by employing the pressure Pe for correction.

The oxygen content $C_{O2}$ thus computed is compared with the target oxygen content $C_{O2i}$ and, based on the compared deviation, the output vacuum of the control vacuum generator 16 is regulated by the output of the EGR control circuit 14 using the pressures in the intake vacuum leading-in passageways 9 and the atmospheric pressure leading-in passageway 15. The opening of the EGR control valve 12 is thus controlled to regulate the EGR amount so as to reduce the compared deviation to zero.

What is claimed is:

1. An EGR control device for an internal combustion engine comprising an EGR control valve installed in an EGR passageway communicating with an exhaust system and an intake system of an internal combustion engine, an oxygen sensor for detecting the oxygen content of the intake air installed in the downstream of the opening of the EGR passageway in said intake system, a pressure sensor for detecting the atmospheric pressure in said oxygen sensor, and EGR control means for computing a first quantity corresponding to a target EGR rate, correcting the output signal of said oxygen sensor using the output signal of said pressure sensor, and opening or shutting said EGR control valve in proportion to the deviation of the second quantity thus corrected from said first quantity in order to set the operating condition of said engine in conformity with a predetermined target EGR.

2. An EGR control device for an internal combustion engine comprising an EGR control valve installed in an EGR passageway communicating with an exhaust system and an intake system of an internal combustion engine, an oxygen sensor for detecting the oxygen content of the intake air installed in the downstream of the opening of the EGR passageway in said intake system, an opening sensor for detecting the opening of a throttle valve installed in said intake system and used to regulate the air amount taken in by said intake system of said engine, an RPM detector for detecting the RPM of said engine, and EGR control means for computing a quantity to let the target oxygen content conform to a target EGR rate predetermined in accordance with the operating conditions of said engine, for correcting the output signal of said oxygen sensor with a quantity corresponding to the outer peripheral pressure computed from the output signals of said throttle opening sensor and said RPM detector, and for regulating the opening of said EGR control valve in proportion to the deviation of the computed quantity corresponding to the oxygen content thus corrected from the computed quantity corresponding to said target oxygen content.

3. An EGR control device for an internal combustion engine comprising an EGR control valve installed in an EGR passageway communicating with an exhaust system and an intake system of an internal combustion engine, an oxygen sensor for detecting the oxygen content of the intake air installed in the downstream of the opening of the EGR passageway in said intake system, an intake amount sensor installed in said intake system of said engine and used to detect the air amount taken in by said engine, an RPM detector for detecting the RPM of said engine, and EGR control means for computing a quantity to let the target oxygen content conform to a target EGR rate predetermined in accordance with the operating conditions of said engine, for correcting the output signal of said oxygen sensor with a quantity corresponding to the outer peripheral pressure computed from the output signals of said intake amount sensor and said RPM detector, and for regulating the opening of said EGR control valve in proportion to the deviation of the computed quantity corresponding to the oxygen content thus corrected from the computed quantity corresponding to said target oxygen content.

4. An EGR control device as claimed in claim 3, wherein said quantity corresponding to the outer peripheral pressure is computed as $A/N_E$, given that the intake flow rate obtained from the output signal of said intake amount sensor is A and that the speed obtained from the output signal of said RPM detector is $N_E$.

* * * * *